US008140087B2

(12) United States Patent
Hazra et al.

(10) Patent No.: US 8,140,087 B2
(45) Date of Patent: Mar. 20, 2012

(54) TECHNIQUES FOR ALWAYS ON ALWAYS CONNECTED OPERATION OF MOBILE PLATFORMS USING NETWORK INTERFACE CARDS

(75) Inventors: Mousumi Hazra, Beaverton, OR (US); Liuyang Lily Yang, Portland, OR (US); Marc Jalfon, Zichron Yaakov (IL); Mandar Joshi, Portland, OR (US); James Tsai, Beaverton, OR (US); Carol Bell, Beaverton, OR (US); Krishna Paul, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1127 days.

(21) Appl. No.: 11/688,038

(22) Filed: Mar. 19, 2007

(65) Prior Publication Data
US 2008/0233962 A1  Sep. 25, 2008

(51) Int. Cl.
*H04Q 7/20* (2006.01)
(52) U.S. Cl. ................ 455/452.2; 713/320; 455/450
(58) Field of Classification Search ........ 455/450–452.2
See application file for complete search history.

(56) References Cited

U.S. PATENT DOCUMENTS

| 6,567,855 | B1 * | 5/2003 | Tubbs et al. | 709/232 |
|---|---|---|---|---|
| 7,047,428 | B2 * | 5/2006 | Bui | 713/320 |
| 2004/0009751 | A1 * | 1/2004 | Michaelis et al. | 455/62 |
| 2007/0055956 | A1 * | 3/2007 | Pellet | 717/120 |

OTHER PUBLICATIONS

Tso, M.M. et al., "Always connected mobile computing" In: Universal Personal Communications, 1996 5th IEEE International Conference on vol. 2, Sep. 29-Oct. 2, 1996, pp. 918-924.
International Search Report/Written Opinion for PCT Patent Application No. PCT/US2008/057116, Mailed Aug. 14, 2008, 9 Pages.
International Preliminary Report on Patentability received for PCT Patent Application No. PCT/US2008/057116, mailed on Oct. 1, 2009, pp. 5.

* cited by examiner

*Primary Examiner* — Dwayne Bost
*Assistant Examiner* — Joseph Dean, Jr.
(74) *Attorney, Agent, or Firm* — Thorpe North & Western LLP

(57) ABSTRACT

An embodiment of the present invention provides an apparatus, comprising a network interface (NIC) card operable in communication with a mobile platform to monitor network traffic and perform filtering to enable decreased system resource use in said mobile platform when in an Always On Always Connected (AOAC) state.

12 Claims, 3 Drawing Sheets

TECHNIQUES FOR ALWAYS ON ALWAYS CONNECTED OPERATION OF MOBILE PLATFORMS USING NETWORK INTERFACE CARDS

BACKGROUND

The future of highly mobile platforms, such as but not limited to, ultra-mobile personal computers (UMPCs) and NB platforms, relies on continuously maintaining network connectivity while the platform is operating in a very low power state, known as connected standby or Always On Always Connected (AOAC) state. Such usage is more commonly found in today's handheld devices to handle instant e-mail sync, IM and VoIP, just to name a few usages. The goal of AOAC is to provide user-perceived constant connectivity without compromising battery life for mobile platforms to offer truly mobile experience that can compete with cell phone or handheld devices.

Thus, a strong need exists for techniques for always on always connected operation of mobile platforms using network interface cards.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
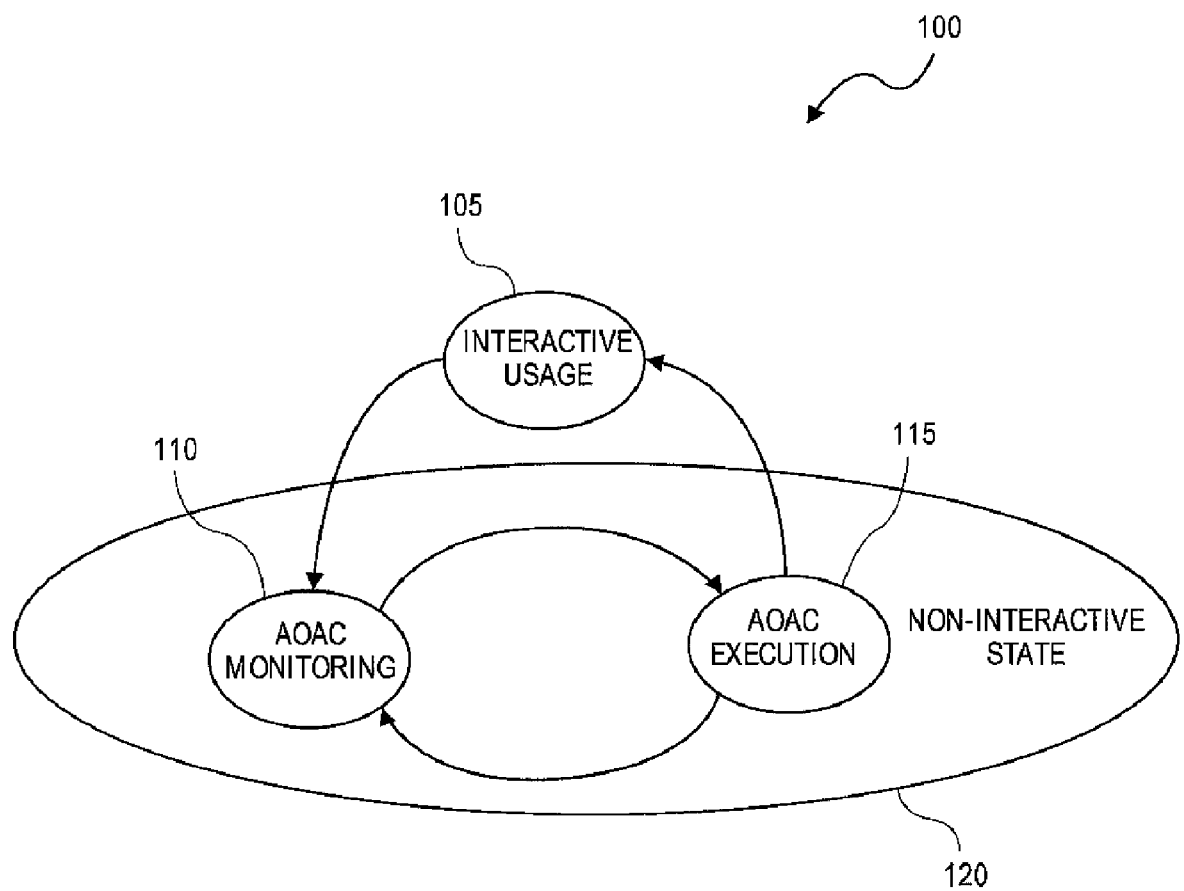
FIG. 1 shows the system operation of all closed-lid use cases modeled by two distinct logical states and the state machine in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" if used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

Although the following description may illustrate a wireless local area network (WLAN) as an example to discuss the concept, it is understood that the same intelligent NIC features may be provided in any of the aforementioned wireless networks to support AOAC. As shown in FIG. 1, generally as 100, in an embodiment of the present invention, the system operation of all closed-lid use cases may be modeled with two distinct logical states and the state machine.

The AOAC monitoring state 110 may be is used to determine if there is an available network connection or there is need to perform a network task. This typically involves the network interface card (NIC) and possibly a small subset of system resources to assist the task of monitoring, depending on the exact use cases and the AOAC architecture implemented. Ideally, in an embodiment of the present invention, the main CPU and other major components (like display, chipset, memory, hard disk, audio, etc.) are either off or in very low power sleep state so that the whole system consumes minimum level of power. Monitoring is necessary to determine if there is a need to go into execution state 115 where more system resources are involved and hence higher level of power is consumed. An embodiment of the present invention provides for the option for AOAC monitoring intelligence to be added to the network interface cards (NICs) and/or a separate micro controller (uC) that may be present in the chipset. An Intelligent NIC (I-NIC) has added intelligence which allows it to monitor network traffic and perform filtering to only allow the interested packet waking up the host or uC. It also may maintain L2 connections, performs (Address Resolution Protocol) ARP reply, and possibly send keep alive messages to maintain connections at L3 and above without waking up the host CPU or uC.

In AOAC monitoring mode 110, when the NIC detects an incoming packet of interest (matching one of the filters), the NIC may send a wake indication to the system using the Wake on Event mechanisms. When a network task requires waking up more system resource beyond what the monitoring state allows, the system enters AOAC Execution State 115 to perform this task. Typically, a processor (either the main CPU or a separate micro controller) is needed to perform such task with access to some other system components (like memory, chipset, etc.).

An operating system may be required to support the full TCP/IP protocol stack and the application relevant to the use case. AOAC execution state 115 is not intended for full user interaction, but instead, it is intended to process just the events or tasks that I-NIC identifies in monitoring state 110 when in interactive usage 105. Therefore, not all system components are needed in the execution state, e.g., display may not be needed for most use cases. Overall the system consumes higher level of power than the AOAC monitoring state and upon completing a network task in the execution state 115, (e.g., after handling a house keeping packet), the system may decide to go back to monitoring state 110.

In an embodiment of the present invention, the Intelligent NIC is a key part of this AOAC solution. There are several items that the NIC may need to support. This includes a host to NIC interface to configure filters and timers in the NIC. The NIC should have the ability to receive packets without the host, process the received packets according to protocol, including L2 or even L3 or higher filtering based on source and destination IP address and type of application/protocol. The NIC should have the ability to wake up the host or uC from a standby state when filtering dictates the need for this. Finally the NIC needs to have the ability to maintain L2/L3/ . . . /application connectivity at least for a certain period of time so that the system can stay in the low power state to avoid battery drainage. For example, and not by way of limitation, the NIC may need to transmit keep-alive packets (initiated by NIC), respond to ARP packets, etc. The following is a list of the functionalities for Intelligent NIC—although it is understood that this is not an exhaustive list and generally the more functionalities the NIC has, the less frequent the host has to wake up and so the less drain on battery for the users.

(1) Filtering: In Sx very little traffic is received, so WLAN NIC should have enough resources (MIPs/memory) to do the filtering based on pattern matching on the packet header.

(2) Keepalives: WLAN NIC should be able to send keepalives in Sx; this may include Layer-2, Layer-3, and Layer-3 or above (e.g. Session Initiation Protocol (SIP) or IMS.

(3) ARP Proxy—respond to ARP packets. NIC needs to send ARP responses on-behalf-of the STA.

(4) Maintaining persistent L2 connection in Sx:
a. Roaming trigger detection such as when the link quality (as indicated by RSSI) is decreasing over time; or when multiple beacons are missed; etc.
b. Scanning to identify a list of access points (APs) that are nearby as potential candidates for the device to connect to, should it lose its association with the current AP.
c. Waking up the host or uC by internal event at the NIC (e.g., when roaming trigger is detected and at least one other candidate AP is found by scanning).

(5) Selective packet processing: To reduce waking up the host or uC for packet processing, the Intelligent NIC may have capability of processing certain network traffic, depending on the network stack and application intelligent offloaded in the intelligent NIC.

Figure 2:
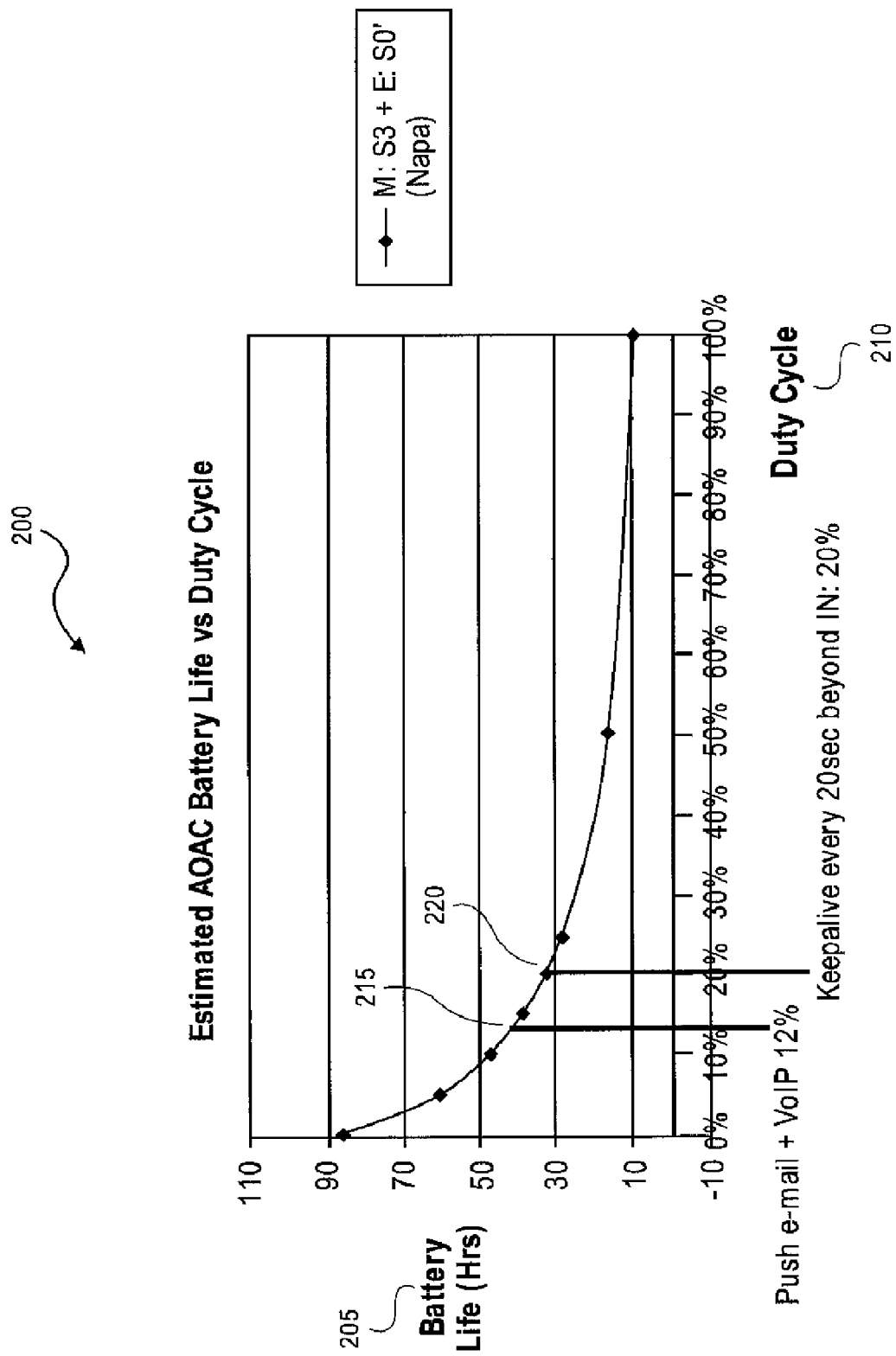
FIG. 2 graphically illustrates an estimated AOAC battery life vs. duty cycle according to one embodiment of the present invention.
Figure 3:
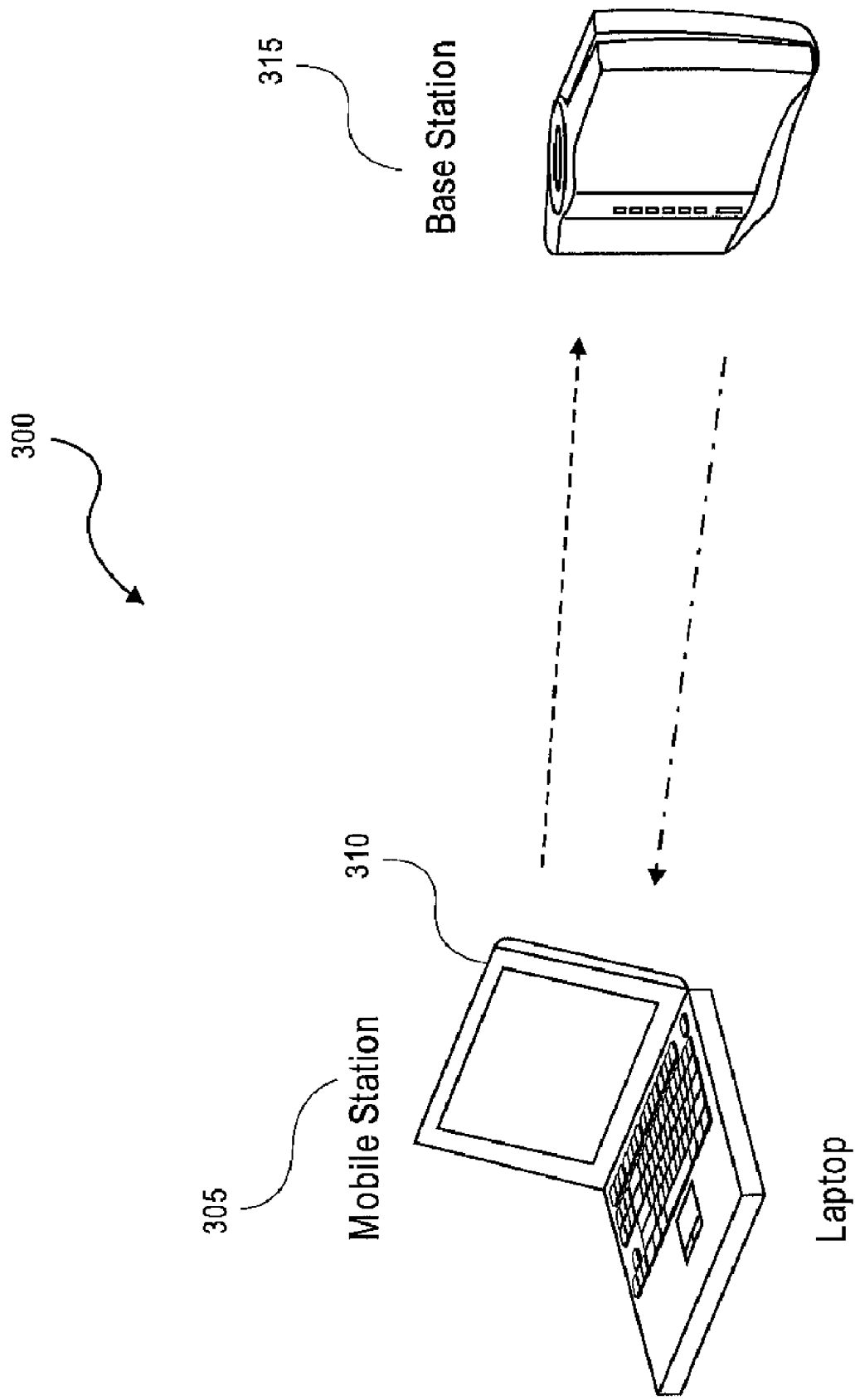
FIG. 3 illustrates a system according to one embodiment of the present invention.

(6) Internet Security Protocol (IPSEC) encryption/decryption: The Intelligent Network Interface Card (INIC) may have capability for encryption/decryption using the IPSEC offloading API. Note this is not for key generation (that needs to be done on the host) or uC;

Turning now to FIG. 2 at 200 is a graphical illustration of the estimated AOAC battery life 205 vs. duty cycle 210 according to one embodiment of the present invention. 215 illustrates the point on the graph for push e-mail+Voice over IP (VoIP) and 220 shows the keep alive every 20 seconds.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by a system, by a station, by a processor or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the present invention may provide a machine-accessible medium that provides instructions, which when accessed, cause a machine to perform operations comprising controlling a network interface (NIC) card operable in communication with a mobile platform to monitor network traffic and perform filtering to enable decreased system resource use in said mobile platform when in an Always On Always Connected (AOAC) state. Further, the machine-accessible medium may further comprise further instructions, which when accessed, cause a machine to perform operations further comprising using an AOAC monitoring state and an AOAC execution state by said NIC.

A further embodiment of the present invention provides a system 100, comprising a base station (MS) 115 and a mobile platform such as an ultra mobile PC 105, which may have antenna 110, operable to communicate with said base station (BS), wherein said UMPC is adapted to use a network interface (NIC) card operable in communication with the mobile platform to monitor network traffic and perform filtering to enable decreased system resource use in the mobile platform when in an Always On Always Connected (AOAC) state.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a mobile platform network interface card (NIC) to monitor network traffic and perform filtering to enable decreased system resource use in a mobile platform when in an Always On Always Connected (AOAC) state, wherein the NIC comprises an AOAC monitoring intelligence enabling an AOAC monitoring state and an AOAC execution state operating independently of a host processor of the mobile platform, wherein the AOAC execution state has a higher power consumption level than the AOAC monitoring state and wherein the AOAC execution state wakes up a system resource beyond system resources used in the AOAC monitoring state to maintain L2 connections without waking the host processor.

2. The apparatus of claim 1, wherein said AOAC monitoring state is used to determine if there is an available network connection or there is need to perform a network task.

3. The apparatus of claim 1, wherein the functionalities provided by said NIC to enable less frequent mobile platform host wake up and therefore less drain on a battery powering said mobile platform are selected from at least the group consisting of:
 (1) Filtering;
 (2) Keepalives;
 (3) ARP Proxy;
 (4) Maintaining persistent L2 connection in sleeping state;
 (5) Selective packet processing; and
 (6) IPSEC encryption/decryption.

4. The apparatus of claim 1, wherein said mobile platform includes the host processor and a display and when said apparatus is in the AOAC monitoring state the host processor and display are either off or in very low power sleep state so that the system resources consume a minimum level of power.

5. The apparatus of claim 1, wherein said mobile platform is an ultra mobile personal computer (UMPC).

6. A method, comprising:
using a mobile platform network interface card (NIC) to monitor network traffic and perform filtering to enable decreased system resource use in a mobile platform when in an Always On Always Connected (AOAC) state, wherein the NIC comprises an AOAC monitoring intelligence enabling an AOAC monitoring state and an AOAC execution state operating independently of a host processor of the mobile platform, wherein the AOAC execution state has a higher power consumption level than the AOAC monitoring state and wherein the AOAC execution state wakes up a system resource beyond system resources used in the AOAC monitoring state to maintain L2 connections without waking the host processor.

7. The method of claim 6, wherein the functionalities provided by said NIC to enable less frequent mobile platform host wake up and therefore less drain on a battery powering said mobile platform are selected from at least the group consisting of:
 (1) Filtering;
 (2) Keepalives;
 (3) ARP Proxy;
 (4) Maintaining persistent L2 connection in sleeping state;
 (5) Selective packet processing; and
 (6) IPSEC encryption/decryption.

8. The method of claim 6, further comprising including in said mobile platform the host processor and a display and when said mobile platform is in the AOAC monitoring state the host processor and display are either off or in very low power sleep state so that the system resources consume a minimum level of power.

9. The method of claim 6, further comprising connecting said NIC to an ultra mobile personal computer (UMPC).

10. A machine-accessible medium that provides instructions, which when accessed, cause a machine to perform operations comprising:
controlling a mobile platform network interface card (NIC) to monitor network traffic and perform filtering to enable decreased system resource use in a mobile platform when in an Always On Always Connected (AOAC) state, wherein the NIC comprises an AOAC monitoring intelligence enabling an AOAC monitoring state and an AOAC execution state operating independently of a host processor of the mobile platform, wherein the AOAC execution state has a higher power consumption level than the AOAC monitoring state and wherein the AOAC execution state wakes up a system resource beyond system resources used in the AOAC monitoring state to maintain L2 connections without waking the host processor.

11. The machine-accessible medium of claim 10, further comprising further instructions, which when accessed, cause a machine to perform operations further comprising using said AOAC monitoring state to determine if there is an available network connection or there is need to perform a network task.

12. A system, comprising:
a mobile platform;
a mobile platform network interface card (NIC) to monitor network traffic and perform filtering to enable decreased system resource use in the mobile platform when in an Always On Always Connected (AOAC) state,
wherein said NIC comprises AOAC monitoring intelligence enabling an AOAC monitoring state and an AOAC execution state operating independently of a host processor of the mobile platform, wherein the AOAC execution state has a higher power consumption level than the AOAC monitoring state and wherein the AOAC execution state wakes up a system resource beyond system resources used in the AOAC monitoring state to maintain L2 connections without waking the host processor.

* * * * *